April 14, 1931. J. E. BROWNING 1,801,073
AUTOMATIC FIREARM
Original Filed Sept. 10, 1929  3 Sheets-Sheet 1
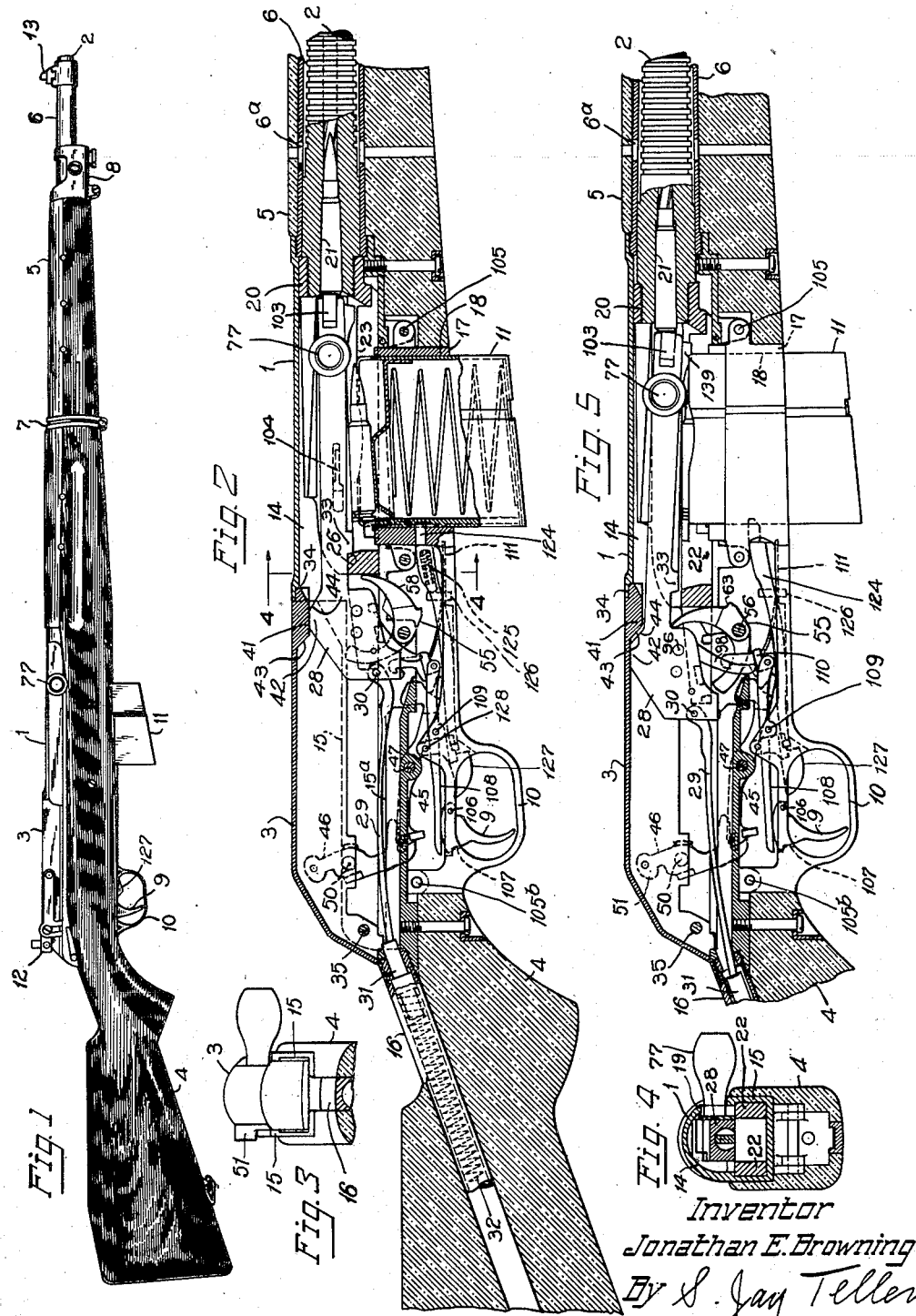
Inventor
Jonathan E. Browning
By S. Jay Teller
Attorney

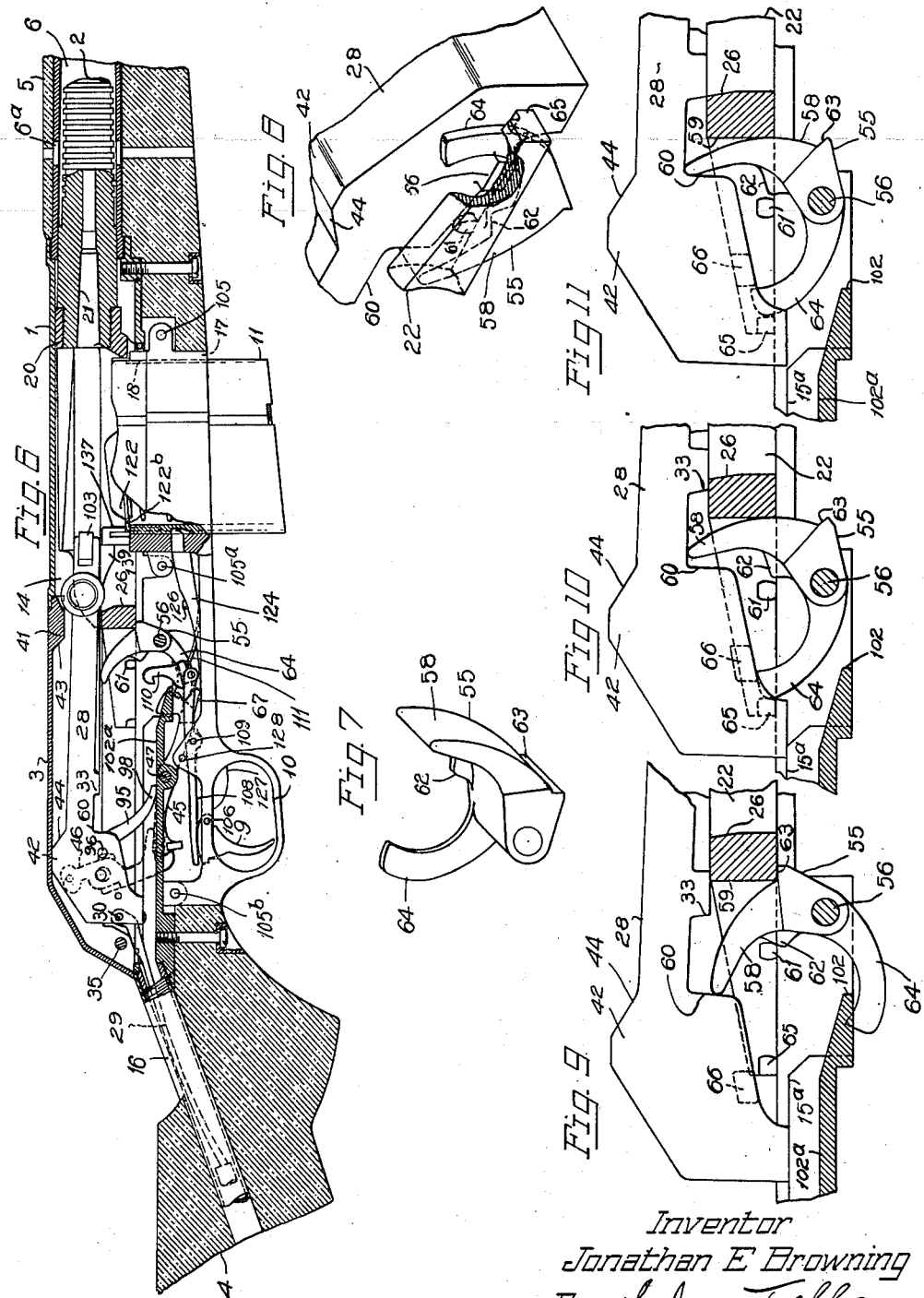

April 14, 1931.   J. E. BROWNING   1,801,073
AUTOMATIC FIREARM
Original Filed Sept. 10, 1929   3 Sheets-Sheet 3
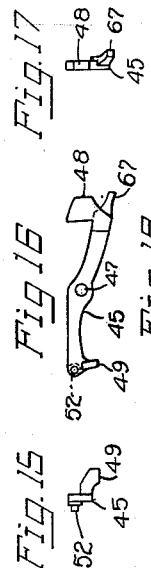
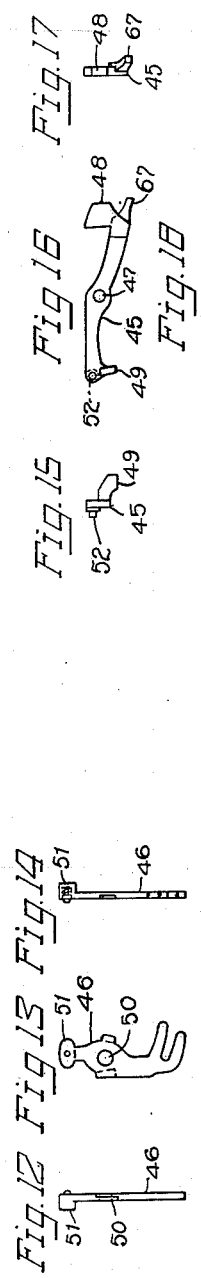
Inventor
Jonathan E. Browning
By S. Jay Teller
Attorney Patented Apr. 14, 1931

1,801,073

UNITED STATES PATENT OFFICE

JONATHAN EDMUND BROWNING, OF OGDEN, UTAH, ASSIGNOR TO J. E. BROWNING COMPANY, OF OGDEN, UTAH, A CORPORATION OF UTAH

AUTOMATIC FIREARM

Application filed September 10, 1929, Serial No. 391,675. Renewed February 26, 1931.

This invention is applicable to a shoulder arm of rifle caliber and I have shown such a firearm so constructed as to require the manual operation of the trigger to effect the firing of each shot. In regard to this latter feature, however, I do not necessarily limit myself and as concerns some of its phases the invention is applicable to firearms adapted for full automatic or volley firing.

The invention relates particularly to a firearm, such as disclosed in my copending application for automatic firearms, Serial No. 262,818 filed March 19, 1928, wherein the barrel and barrel extension and also the breech slide or bolt move rearward upon recoil to a limited extent and wherein the breech bolt is then permitted to move rearward separate from and to a greater extent than the barrel and barrel extension, being returned to its forward locked position automatically. The separate rearward movement of the breech bolt effects the extraction and ejection of the cartridge shell, effects the cocking of the firing mechanism and effects the transfer of a cartridge from the magazine to the firing chamber.

One of the objects of the present invention is to provide an improved means for insuring a proper relative timing of the recoil and counter-recoil movements of the barrel extension and the breech bolt.

A further object of the invention is to provide an improved safety device for the firearm.

Further objects of the invention will be apparent from the following specification and claims.

In the accompanying drawings I have shown the embodiment of the invention which I now deem preferable but it will be understood that the drawings are intended for illustrative purposes only and are not to be construed as defining or limiting the scope of the invention, the claims forming a part of this specification being relied upon for that purpose.

Of the drawings:

Fig. 1 is a right side view of a firearm embodying the invention.

Fig. 2 is an enlarged fragmentary longitudinal sectional view taken from the right.

Fig. 3 is a fragmentary rear view on the same scale as Fig. 2.

Fig. 4 is a transverse vertical sectional view taken along the line 4—4 of Fig. 2.

Figs. 5 and 6 are views similar to Fig. 2 but showing the parts in different relative positions.

Fig. 7 is an enlarged perspective view of the combined accelerator and barrel extension regulating device.

Fig. 8 is a fragmentary perspective view on the same scale as Fig. 7 and showing certain portions of the barrel extension, breech bolt and associated parts.

Figs 9, 10 and 11 are fragmentary views on the same scale as Figs. 7 and 8, these views being partly diagrammatic and showing the action whereby the barrel extension and breech bolt are maintained in proper timed relation.

Figs. 12, 13 and 14 are rear, side and front views respectively of the manually operable safety lever.

Figs. 15, 16, 17 and 18 are rear, side, front and bottom views respectively of the connecting safety lever.

Fig. 19 is a fragmentary longitudinal sectional view showing the firing mechanism and the magazine.

Fig. 20 is a fragmentary longitudinal sectional view showing the extractor and ejector.

Figs. 21, 22, 23 and 24 are detail views of the magazine ejector.

In the drawings Fig. 1 is a right side view of the gun as a whole, the receiver being shown at 1, the barrel at 2, the breech cover at 3, the stock at 4, the barrel cover at 5, and the barrel jacket at 6. The jacket may be provided with vent holes 6ª, 6ª (see Fig. 2) registering with similar holes in the stock and barrel cover for cooling the gun. The stock and barrel cover are connected by means of rear and forward bands 7 and 8. The trigger is shown at 9, the trigger guard at 10, and the magazine at 11. Sights are shown at 12 and 13, but the invention does not relate to the sights, as sights of other types may be substituted for those shown.

As shown in Figs. 2 and 4, the receiver 1 has a main substantially tubular portion 14 which is open at the rear and front ends and which is adapted to be connected at its front end with the rear end of the barrel jacket 6, a threaded connection being shown. The receiver 1 is provided with parallel longitudinal side walls 15, 15 which are adapted to receive between them the lower part of the barrel extension and to serve as guides controlling the longitudinal movement thereof. At the rear the receiver is connected with the reaction spring tube 16 which extends rearward and downward. Connected with the receiver at the bottom thereof is a member 17 having a substantially rectangular opening 18 therein, this opening serving to receive the magazine 11. The member 17 has the trigger guard 10 formed thereon, and it also supports certain operative parts of the gun as will presently appear. The tubular portion 14 of the receiver is provided with an opening 19 at one side, ordinarily the right side, positioned to permit the ejection of empty shells therethrough.

The barrel 2 and the barrel extension 20 are suitably connected together as by threading and the barrel is provided at the rear with the usual cartridge chamber 21. The barrel extension is formed to receive the breech bolt as will presently appear and it is further formed at the bottom with guide portions 22, 22 adapted to fit between and be guided by the side walls 15, 15 of the receiver. The relationship between the barrel extension and the receiver is clearly shown in Fig. 4. Upon assembly the barrel and barrel extension are inserted from the rear, the barrel extension being guided between the walls 15, 15. When the mechanism is completely assembled the barrel and barrel extension have only a limited movement with respect to the receiver. The barrel extension 20 is provided with a relatively large bottom opening 23 adapted to receive the upper part of the magazine 11 and to permit the passage of cartridges therethrough. At the rear of the opening 23 there is formed a forward facing shoulder 26. The barrel extension has an opening in the side thereof which normally registers with the opening 19 in the receiver and is adapted for the ejection of empty cartridges.

Fig. 2 shows the breech bolt 28 in its normal relationship with the other parts of the gun and this figure also shows some of the details of the said breech bolt. Other details will be described later. The main body of the breech bolt 28 is preferably of unitary construction, having all of its parts rigidly maintained in fixed relation to each other. The breech bolt 28 is held in its forward position by means of a strut 29 pivotally connected with the rear portion of the said bolt at 30. The rear end of the strut 29 engages a plunger 31 which is slidable in the reaction spring tube 16. The reaction spring 32 in the said tube serves to push the plunger 31 forward and thus through the strut 29 serves to push the breech bolt 28 forward and yieldingly hold it in its forward position.

The breech bolt 28 has a downward projecting lug 33 which normally extends into the opening 23 in the barrel extension, the rear face of the lug engaging the shoulder 26. When the lug and the shoulder are thus engaged the breech bolt and barrel extension are positively locked together in the proper position for firing. Upon recoil unlocking is effected by causing the breech bolt or at least the rear part thereof to move transversely or diagonally with respect to the direction of movement of the barrel extension. Preferably only the rear end of the bolt is thus moved diagonally, the front end moving directly rearward and the bolt being thus given an angular or tilting movement about a transverse axis near the front end thereof.

Figs. 2 and 3 show the breech cover 3 in its operative relationship with the other parts. It will be observed that in assembly the front part of the breech cover is hooked under a portion of the receiver at the rear as indicated at 34 and the side walls of the cover extend down between the side walls 15, 15 of the receiver as clearly shown in Fig. 3. The cover is held in place by means of a transverse pin 35 which extends through transverse holes in the cover and in the said side walls 15, 15.

The breech cover 3 has at the front a downward projection 41 which is adapted to engage an upward projection 42 on the breech bolt as shown in Fig. 2, the said projections being provided respectively with inclined cam surfaces 43 and 44. When the two projections are in engagement as shown the breech bolt and barrel extension are held in their described locked relationship, it being impossible for the lug 33 to become disengaged from the shoulder 26.

As shown in Fig. 19 the various parts of the gun are in the normal position ready for firing, firing, however, being impossible by reason of the position of the safety levers 45 and 46. These safety levers are shown in detail in Figs. 12 to 18. The safety lever 45 is pivotally mounted at 47 on a stud carried by the receiver at the left side. At the forward end of the lever 45 is an upward extension 48 which extends through a slot in the receiver and is adapted to project into the path of movement of the rear end of the breech bolt as clearly shown in Fig. 19. The safety lever 45 is further provided with a downward extension 49 which serves to lock the trigger, as will be hereinafter explained, when the lever is in the position shown in Fig. 19. The lever 45 can be operated by means of the manually operable lever 46 which is pivoted at 50 to the detachable cover 3. The upper end of the lever carries a finger piece 51 which is exposed at the left of the cover, and the lower end is slotted to detachably engage a stud 52 carried by the lever 45. By manually operating the lever 46 the lever 45 can be moved either to the safe position as shown in Fig. 19 or to the firing position shown in Fig. 2 wherein the breech bolt and trigger are free for movement. When the cover 3 is removed the lever 46 is removed with it.

As already stated the breech bolt and barrel extension are directly locked together when in the firing position. When firing occurs the barrel and barrel extension move rearward under the force of the recoil, and the breech bolt, by reason of the described locked relationship, initially moves rectilinearly in unison with them. As already stated the breech block is unlocked from the barrel extension by moving at least a part thereof away from its initial path of rectilinear movement. When the engagement between the breech bolt and the barrel extension is by means of a downward projecting lug such as 33, the breech bolt, or at least a part thereof, is moved transversely or diagonally, upward and rearward until the lug 33 is disengaged from the barrel extension. After disengagement the breech bolt continues to move rearward and the motion of the barrel extension and barrel is stopped. For effecting the transverse or diagonal unlocking movement of the breech bolt I have shown a single means serving upon recoil first to unlock the breech bolt as described and then to move it rearward separately from the barrel and barrel extension.

Mounted in the receiver is a member 55 which I will refer to as an accelerator, this member being shown in detail in Fig. 7. The accelerator is pivotally mounted on a transverse pin 56 which extends into bearing apertures in the receiver. The main body portion of the accelerator is curved upward and rearward, having a convex forward facing surface 58 which is adapted to cooperatively engage the flat rearward facing surface 59 of the barrel extension. By reason of the engagement of the accelerator with the surface 59 of the barrel extension the said accelerator is moved during recoil in the counter-clockwise direction until the upper end thereof engages the breech bolt at 60. The timing is such that when the accelerator engages the breech bolt as stated the breech bolt has moved rearward sufficiently to permit the flat horizontal surfaces of the projections 41 and 42 to disengage each other, the rear part of the breech bolt then being free to move diagonally upward and rearward along a path determined by the engagement of the cam surfaces 43 and 44. Continued pressure exerted by the rearward moving barrel extension on the accelerator causes the accelerator to force the rear part of the breech bolt upward and rearward to the position shown in Fig. 5 in which position the lug 33 is about to disengage the shoulder 26. It will be observed that the front part of the breech bolt does not partake of the diagonal movement but moves in a substantially straight path. The rearward pressure of the barrel extension upon the accelerator continues and the accelertor now serves to move the breech bolt rapidly rearward, imparting to it a velocity which enables it to move in opposition to the spring 32 approximately to the position shown in Fig. 6, being guided in part by the inner surface of the cover. During its separate rearward movement the rear part of the breech bolt is also guided by ledges 15$^a$ formed on the receiver. It will be seen that the accelerator serves to transfer the energy of the moving barrel and barrel extension to the said breech bolt, the result being that the movement of the barrel and barrel extension is gradually retarded and finally stopped while the absorbed energy is imparted to the breech bolt to throw it rearward to the position of recoil.

As clearly indicated in Fig. 6 the lower surface of the lug 33 of the breech bolt remains in engagement with the accelerator during the separate rearward and return movements of the breech bolt. Thus the accelerator is held in its rearmost position as indicated. It will be observed that the lower surface of the lug 33 is so inclined with respect to the main body of the bolt that upon angular movement of the bolt it assumes a position parallel with the direction of the separate rearward movement. Thus, the accelerator is held immovable during such movement.

There is provided a stop 61 on the barrel extension which is engaged by the accelerator 55 when the extreme position is reached, the said accelerator being provided with a surface at 62 to engage the said stop. The engagement of the stop with the accelerator prevents further rotative movement of the latter and at the same time a shoulder 63 on the accelerator engages the bottom of the barrel extension.

As soon as the breech bolt reaches its rearmost position as shown in Fig. 6 it is immediately returned in the forward direction by reason of the action of the spring 32 and associated parts. As the breech bolt moves forward the lug 33 releases the accelerator and immediately thereafter the forward facing surface at 60 re-engages the accelerator and causes it to move in the clockwise direction to the position shown in Fig. 5. As the accelerator moves in the clockwise direction the barrel and barrel extension move forward in unison with the breech bolt but at a slower speed. As soon as the position shown in Fig. 5 is reached the cam surfaces 43 and 44 engage each other, the result being that as the breech bolt continues to move forward it is returned to its locked relationship with the barrel extension. The final movement of the breech bolt in the forward direction carries the barrel and barrel extension with it in locked relationship, thus completely restoring the parts to the relationship shown in Fig. 2.

In accordance with the present invention I provide novel means for maintaining the proper timed relationship of the barrel extension and breech bolt during their recoil and counter-recoil movements, particularly during the latter. For this purpose I provide what I will term a timing element which is connected for movement by the barrel extension in one direction during recoil and for movement by the breech bolt in the other direction during counter-recoil. The timing element preferably has a portion movable transversely of the longitudinal lines of the gun. Preferably and as illustrated, the timing element is directly connected with or formed as a part of the accelerator as indicated at 64 in Fig. 7.

The action of the timing element 64 and its cooperative relationship with other parts are shown clearly in Figs. 8 to 11.

As already stated, during counter-recoil movement the accelerator is moved in the clockwise direction, its movement being initially effected by means of the forward facing surface 60 on the breech bolt, as shown in Fig. 9. The timing element 64 is positioned to project upward into the space between the left hand side of the breech bolt and the left hand wall 22 of the barrel extension as shown in Fig. 8. Formed on the said left hand wall of the barrel extension is an inward projecting lug 65 the forward surface of which serves as an abutment adapted to be engaged by the timing element 64 as shown. The timing element 64 is curved, the curvature being such that, for all positions in front of that shown in Fig. 10, the timing element is in engagement with the said lug 65. It will be understood that at the same time the forward facing surface 58 of the accelerator proper remains in engagement with the surface 59 of the barrel extension. It will thus be apparent that the combined accelerator and timing element is normally held in predetermined relationship with the barrel extension, movement of the barrel extension being possible only when the timing element is correspondingly moved.

Carried by the breech bolt at the left hand side thereof is an outward projecting lug 66 the bottom surface of which serves as a stop to engage the timing element 64. Normally the breech bolt and the barrel extension move forward in proper timing so that they return to their normal locked relationship as shown in Fig. 2. There is, however, a possibility that under some conditions the said parts may get out of their proper timed relationship, the breech bolt being relatively retarded or held back so as to be at the rear of the position which it ought to occupy with respect to the barrel extension. In Fig. 10 I have shown the breech bolt in this relatively retarded position, it being obvious that the relationship is such that the lug 33 cannot enter into engagement with the shoulder 26. It will be observed, however, that in the position shown in Fig. 10 the abutment surface of the lug 66 is positioned above or in the path of the upper end of the timing element 64, thus serving to prevent upward movement of the timing element. As already explained the timing element is connected in definite relationship with the barrel extension and the result is that the abutment 66, acting through the timing element and the abutment 65, serves to prevent any further forward movement of the barrel extension until the breech bolt has moved relatively forward approximately to the position shown in Fig. 11.

As soon as the parts fully reach the relative positions as shown in Fig. 11 the lug 33 is ready or substantially ready to engage the shoulder 26. Forward movement of the parts has caused the timing element 64 to move transversely or upward so as to engage the abutment surface on the rear of the lug 66. The timing element 64 then serves as a means for positively preventing the barrel extension from moving relatively forward, or for preventing the relative retardation of the breech bolt, so as to maintain the timed relationship and prevent any interference with the completion of the normal locking action. As a matter of actual fact, the timing element 64 projects between the front abutment surface of lug 65 on the barrel extension and the rear abutment surface of lug 66 on the breech bolt and thus serves as a simple spacing element to maintain the proper relationship.

The so-called timing element 64 has an additional function in that it cooperates with the before described safety lever 45. The said lever 45 has a forward extending projection 67 thereon which is adapted to be engaged by the timing element 64 when the parts are in their rearmost positions as shown in Fig. 6. If the parts are held in the positions shown in Fig. 6 (as they may be by a stop to be presently described) the accelerator, and particularly the timing element 64 thereof, serves by reason of its engagement with the extension 67 to positively hold the safety lever 45 in its firing position as shown. This prevents any manual movement of the safety lever to its safety position so long as the breech bolt and other parts are in their rearmost positions. Obviously if the safety lever were permitted to be moved to its safety position with the breech bolt retracted, the projection 48 on the said lever would interfere with the forward counter-recoil movement of the breech bolt and would cause jamming of the gun.

The breech bolt 28 carries at the right side a handle 77 which may be used to manually operate the mechanism of the gun. This handle extends laterally through the opening 19 in the receiver and the corresponding opening in the barrel extension.

As shown in Fig. 19 the breech bolt has a central opening 80 therein adapted to receive the firing pin and firing pin extension, there being a smaller opening 81 at the front through which the firing pin 82 extends to engage the cartridge. The firing pin extension 83 is provided with a central opening 84 for receiving the spring 85. The firing pin 82 is threaded into the front part of the opening 84. The firing pin extension has a transverse slot 86 through which extends a horizontal pin 87 located in holes in the breech bolt. This pin 87 serves as a rear abutment for the spring 85. The spring 85 reacting against the pin 87 tends to move the entire firing pin and extension forward to firing position. The firing pin and firing pin extension are held in their rearmost cocked position as shown in Fig. 19 by means of a sear 88 which engages a shoulder 89 at the rear of the firing pin extension. The sear 88 is pivotally mounted on a transverse pin 90 which is located in transverse holes in the breech bolt. A spring 92 supported on a transverse pin 93 serves to press the sear upward. The sear is provided with a downward hook extension 94 adapted to be engaged by the trigger lever as will presently be described.

The cocking lever 95 is shown in its operative relation with other parts in Figs. 6 and 19. This lever is pivotally mounted on a transverse pin 96 which is located in transverse holes in the breech bolt. The lower part 98 of the lever is slotted, and the upper part 99 thereof is also slotted with the two spaced parts thereof extending into recesses 100 in the opposite sides of the firing pin extension, being adapted to engage the surfaces 101 at the rear ends of the said recesses. When the mechanism is in the firing position as shown in Fig. 19 the lower end of the cocking lever is inclined toward the rear being located between the rear part of the accelerator and the adjacent shoulder 102 of the receiver. The firing pin and extension are held in cocked position by the sear 88 as shown so that the surfaces 101 are out of engagement with the cocking lever.

When the firing pin and firing pin extension are released by the sear 88 to effect firing they are forced forward under the action of the spring 85 thus bringing the surfaces 101 into engagement, or substantially into engagement, with the upper part 99 of the cocking lever. Immediately thereafter the breech bolt is forced rearward by the recoil action as already described, first to the position shown in Fig. 5 and then to the position shown in Fig. 6. As the breech bolt moves rearward the lower part 98 of the cocking lever is forced against the shoulder 102 on the receiver and it then travels along the surface 102$^a$ on the receiver as shown in Fig. 6. When the cocking lever reaches the position shown in Fig. 6 the firing pin extension with the firing pin has been forced rearward far enough to permit the sear 88 to engage the shoulder 89 and thus hold the parts in cocked position. As the breech bolt and associated parts return forward to the position shown in Figs. 2 and 19 the motion of the cocking lever is reversed, this lever returning to its original position as described.

Adjacent the forward end of the breech bolt and at the right side thereof there is provided a pivoted extractor 103, shown in Fig. 20, which is normally pressed into its operative position by means of a spring 103$^a$. The extractor cooperates with an ejector 104 pivoted to the barrel extension as shown. Assuming the parts to be in the position shown in Fig. 2, it will be apparent that, when firing occurs and the barrel, barrel extension and breech bolt move rearward as already described, the extractor 103 on the breech bolt will draw the empty shell out of the firing chamber and carry it rearward to a position opposite the ejection openings where it is ejected by the ejector 104. As soon as the breech bolt reaches its rear position as shown in Fig. 6 a cartridge from the magazine 11 is forced upward by the follower in the usual way into the path of return movement of the bolt. As the bolt moves forward the cartridge is pushed into the firing chamber.

As before stated the member 17 has the trigger guard 10 formed as an integral part thereof. The said member is suitably secured in place by pins 105, 105$^a$ and 105$^b$. The trigger 9 is pivotally mounted on the member 17 at 106, and projects downward through an aperture 107 in the said member adjacent the guard 10. The trigger 9 is provided at the top with a cam surface which engages the bottom face of a lever 108, pivoted at 109 to the member 17. Pivoted to the lever 108 is a hooked link 110 which is adapted to detachably engage the sear 88 when the parts are in firing positions as shown in Fig. 19. The link 110 and the lever 108 are both pressed in the counter-clockwise direction by a spring 111. When the trigger is pulled toward the rear, the lever 108 is turned in the clockwise direction, and the link 110 and the sear 88 are pulled downward to release the firing pin.

As already stated, the safety lever 45 is provided with a downward extension 49, this extension directly engaging the lever 108 when the lever 45 is in its safety position as shown in Fig. 19.

The magazine 11 is or may be similar in construction to that shown in my before mentioned copending application, and detailed description is unnecessary. A latch 124 is provided for releasably holding the magazine in place. This latch is in the form of a longitudinally slidable bar which projects at its forward end into the magazine opening, and which is bifurcated at its rear end to permit the trigger lever 108 to move between the two portions thereof. The latch 124 is normally held in its forward operative position by means of a spring 125 and plunger (see Fig. 2) which abuts at its forward end against the latch and at its rear end against a pin 126 projecting upward from the bottom wall of the member 17. For operating the latch 124 there is provided a finger piece 127 pivoted to the member 17 at 128 and extending downward into the space within the trigger guard 10. The finger piece 127 is notched to receive an offset portion of the latch 124 as shown in Fig. 2. It will be apparent that when the finger piece 127 is pressed upward the latch 124 will be drawn rearward so as to release the magazine.

In order that the magazine 11 may be automatically ejected when released by the latch 124 I have provided an ejecting device which is shown in Fig. 19 and the parts of which are illustrated in greater detail in Figs. 21 to 24. The member 17 is formed with a substantially vertical hole 129 immediately adjacent the opening for the magazine 11, this hole being connected with the magazine opening by means of a vertical slot. Slidable within the opening 129 is a plunger 130 which is pressed downward by means of a coil spring 131. The plunger 130 has a pin or projection 132 which extends through the before mentioned slot into the magazine opening so as to be adapted to be engaged by the top of the magazine when in place. The lower end of the hole 129 is closed by a plug 133 which is held in place by a suitable pin. It will be obvious that when the magazine is inserted it engages the pin 132 and presses the plunger 130 upward against the action of the spring 131. As soon as the latch 124 is released the spring 131, acting through the plunger 130 and the pin 132, serves to automatically eject the magazine.

Carried by the member 17 is a vertically movable slide or stop 137 which is normally held in its lowermost position by means of a spring (not shown). A forward extension on the upper end of the slide or stop 137 lies adjacent the rear edge of the magazine and in the path of upward movement of a rear portion 122$^b$ of the magazine follower 122. After the last cartridge has been fired the follower 122 occupies its uppermost position as shown in Fig. 6, the portion 122$^b$ thereof thus engaging the slide or stop 137 and forcing it upward in opposition to the spring. The parts are so related that when the slide reaches its upper position as shown in Fig. 6 it serves as a stop to engage a downward extending lug 139 on the breech bolt 28. Thus the breech bolt is held in its rearmost position as shown after the last cartridge has been fired. This serves as a warning to the gunner that the last cartridge has been fired and that the empty magazine should be replaced by a loaded one, and it also facilitates reloading as it avoids the necessity for manually operating the breech bolt to insert the first cartridge into the firing chamber. After the loaded magazine has been put in place the slide or stop 137 can be released and permitted to return to its inoperative position by simply drawing the breech bolt back slightly to relieve the pressure on the stop. Then the breech bolt can be released and permitted to move forward in the usual way, carrying with it a cartridge from the newly inserted loaded magazine and inserting it into the firing chamber.

What I claim is:

1. A firearm of the class described comprising in combination, a receiver, a barrel and barrel extension movable upon recoil rearward relatively to the receiver, a rearward movable breech bolt normally in locked engagement with the barrel extension, means operative during recoil for unlocking the bolt from the extension to permit separate additional rearward movement thereof and operative during counter-recoil to restore the locked relationship, a pivoted timing element movable by the barrel extension in one direction during recoil and movable by the breech bolt in the other direction during counter-recoil, and an abutment on the barrel extension normally engaging the timing element to retard the counter-recoil movement of the barrel extension and barrel in accordance with the counter-recoil movement of the breech bolt.

2. A firearm of the class described comprising in combination, a receiver, a barrel and barrel extension movable upon recoil rearward relatively to the receiver, a rearward movable breech bolt normally in locked engagement with the barrel extension, means operative during recoil for unlocking the bolt from the extension and operative during counter-recoil for restoring the locked relationship, an accelerator pivoted to the receiver for movement about a fixed transverse axis and engaging the barrel extension to be moved thereby during recoil, the said accelerator upon being so moved serving to move the breech bolt rearward separately from the barrel extension and the said accelerator being moved by the breech bolt in the opposite direction during counter-recoil, a timing element connected with accelerator for pivotal movement in unison therewith, and an abutment on the barrel extension normally engaging the timing element to retard the counter-recoil movement of the barrel extension and barrel in accordance with the counter-recoil movement of the breech bolt.

3. A firearm as set forth in claim 2, wherein the accelerator, prior to moving the breech bolt rearward, serves as a part of the unlocking means and moves at least a portion of the breech bolt transversely with respect to the barrel extension.

4. A firearm of the class described comprising in combination, a receiver, a barrel and barrel extension movable upon recoil rearward relatively to the receiver, a rearward movable breech bolt normally in locked engagement with the barrel extension, means operative during recoil for unlocking the bolt from the extension to permit separate additional rearward movement thereof and operative during counter-recoil to restore the locked relationship, a timing element connected with the barrel extension for movement in timed relation therewith and having a portion which moves in a transverse direction, and a stop on the breech bolt operative during the simultaneous counter-recoil movements of the bolt and barrel extension to interfere with the transverse counter-recoil movement of the said portion of the timing element when the barrel extension is in advance of its proper timed relationship with the bolt, the said stop thus serving through the agency of the timing element to retard the counter-recoil movement of the extension and thereby restore the proper timed relationship.

5. A firearm of the class described comprising in combination, a receiver, a barrel and barrel extension movable upon recoil rearward relatively to the receiver, a rearward movable breech bolt normally in locked engagement with the barrel extension, means operative during recoil for unlocking the bolt from the extension and operative during counter-recoil for restoring the locked relationship, an accelerator pivoted to the receiver for movement about a fixed transverse axis and connected with the barrel extension for movement in timed relation therewith, the said accelerator serving upon recoil to move the breech bolt rearward separately from the barrel extension, means on the accelerator for holding the barrel extension in its rearmost position during the major portion of the separate recoil and counter-recoil movements of the bolt, a timing element connected with accelerator for pivotal movement in unison therewith and having a portion which moves in a transverse direction, and a stop on the breech bolt operative during the simultaneous counter-recoil movements of the bolt and barrel extension to interfere with the transverse counter-recoil movement of the said portion of the timing element when the barrel extension is in advance of its proper timed relationship with the bolt, the said stop thus serving through the agency of the said timing element to retard the counter-recoil movement of the extension and thereby restore the proper timed relationship.

6. A firearm as set forth in claim 5, wherein the accelerator, prior to moving the breech bolt rearward, serves as a part of the unlocking means and moves at least a portion of the breech bolt transversely with respect to the barrel extension.

7. A firearm of the class described comprising in combination, a receiver, a barrel and barrel extension movable upon recoil rearward relatively to the receiver, a rearward movable breech bolt normally in locked engagement with the barrel extension, means operative during recoil for unlocking the bolt from the extension to permit separate additional rearward movement thereof and operative during counter-recoil to restore the locked relationship, an abutment on the bolt having a rearward facing shoulder, and a timing element additional to the unlocking and locking means and automatically movable during the simultaneous counter-recoil movements of the bolt and barrel extension and in timed relation to the movement of the latter to a position behind the abutment, the said timing element engaging the said rearward facing shoulder of the abutment and serving during the interval immediately preceding the locking of the bolt to the barrel extension to maintain the proper timed relationship between the bolt and the barrel extension.

8. A firearm as set forth in claim 7, wherein the timing element is connected with the receiver for movement about a fixed transverse axis.

9. A firearm of the class described comprising in combination, a receiver, a barrel and barrel extension movable upon recoil rearward relatively to the receiver, a rearward movable breech bolt normally in locked engagement with the barrel extension, means operative during recoil for unlocking the bolt from the extension and operative during counter-recoil for restoring the locked relationship, an accelerator pivoted to the receiver for movement about a fixed transverse axis and connected with the barrel extension for movement in timed relation therewith, the said accelerator serving upon recoil to move the breech bolt rearward separately from the barrel extension, means on the accelerator for holding the barrel extension in its rearmost position during the major portion of the separate recoil and counter-recoil movements of the bolt, an abutment on the bolt having a rearward facing shoulder, and a timing element connected with accelerator for pivotal movement in unison therewith and movable during the simultaneous counter-recoil movements of the bolt and barrel extension to a position behind the abutment, the said timing element engaging the said rearward facing shoulder of the abutment and serving during the interval immediately preceding the locking of the bolt to the barrel extension to maintain the proper timed relationship between the bolt and the barrel extension.

10. A firearm as set forth in claim 9, wherein the accelerator, prior to moving the breech bolt rearward, serves as a part of the unlocking means and moves at least a portion of the breech bolt transversely with respect to the barrel extension.

11. A firearm of the class described comprising in combination, a receiver, a barrel and barrel extension movable upon recoil rearward relatively to the receiver, a rearward movable breech bolt normally in locked engagement with the barrel extension, means operative during recoil for unlocking the bolt from the extension to permit separate additional rearward movement thereof and operative during counter-recoil to restore the locked relationship, two companion abutments on the bolt and barrel extension respectively, the abutment on the bolt being normally in advance of that on the extension but being rearward thereof during the separate recoil and counter-recoil movements of the bolt, and a timing element additional to the unlocking and locking means and automatically movable during the simultaneous counter-recoil movements of the bolt and barrel extension to a position behind the bolt abutment and in front of the extension abutment, the said timing element engaging the two abutments to prevent the barrel extension from moving forward out of proper timed relationship with the bolt.

12. A firearm as set forth in claim 11, wherein the timing element is connected with the receiver for movement about a fixed transverse axis.

13. A firearm of the class described comprising in combination, a receiver, a barrel and barrel extension movable upon recoil rearward relatively to the receiver, a rearward movable breech bolt normally in locked engagement with the barrel extension, means operative during recoil for unlocking the bolt from the extension to permit separate additional rearward movement thereof and operative during counter-recoil to restore the locked relationship, a timing element connected with the barrel extension for movement in timed relation therewith and having a portion which moves in a transverse direction, a stop on the breech bolt operative during the simultaneous counter-recoil movements of the bolt and barrel extension to interfere with the transverse counter-recoil movement of the said portion of the timing element when the barrel extension is in advance of its proper timed relationship with the bolt, the said stop thus serving through the agency of the timing element to retard the counter-recoil movement of the extension and thereby restore the proper timed relationship, and an abutment on the bolt having a rearward facing shoulder so positioned that when transverse movement of the timing element is permitted by the stop the said element moves to a position behind the abutment so as to engage it and thereby maintain the proper timed relationship between the bolt and the barrel extension.

14. A firearm of the class described comprising in combination, a receiver, a barrel and barrel extension movable upon recoil rearward relatively to the receiver, a rearward movable breech bolt normally in locked engagement with the barrel extension, means operative during recoil for unlocking the bolt from the extension and operative during counter-recoil for restoring the locked relationship, an accelerator pivoted to the receiver for movement about a fixed transverse axis and connected with the barrel extension for movement in timed relation therewith, the said accelerator serving upon recoil to move the breech bolt rearward separately from the barrel extension, means on the accelerator for holding the barrel extension in its rearmost position during the major portion of the separate recoil and counter-recoil movements of the bolt, a timing element connected with accelerator for pivotal movement in unison therewith and having a portion which moves in a transverse direction, a stop on the breech bolt operative during the simultaneous counter-recoil movements of the bolt and barrel extension to interfere with the transverse counter-recoil movement of the said portion of the timing element when the barrel extension is in advance of its proper timed relationship with the bolt, the said stop thus serving through the agency of the timing element to retard the counter-recoil movement of the extension and thereby restore the proper timed relationship, and an abutment on the bolt having a rearward facing shoulder so positioned that when transverse movement of the timing element is permitted by the stop the said element moves to a position behind the abutment so as to engage it and thereby maintain the proper timed relationship between the bolt and the barrel extension.

15. A firearm as set forth in claim 14, wherein the accelerator, prior to moving the breech bolt rearward, serves as a part of the unlocking means and moves at least a portion of the breech bolt transversely with respect to the barrel extension.

16. A firearm of the class described comprising in combination, a receiver, a barrel and barrel extension movable upon recoil rearward relatively to the receiver, a rearward movable breech bolt normally in locked engagement with the barrel extension, means operative during recoil for unlocking the bolt from the extension to permit separate additional rearward movement thereof and operative during counter-recoil to restore the locked relationship, a timing element connected with the barrel extension for movement in timed relation therewith and having a portion which moves in a transverse direction, a stop on the breech bolt operative during the simultaneous counter-recoil movements of the bolt and barrel extension to interfere with the transverse counter-recoil movement of the said portion of the timing element when the barrel extension is in advance of its proper timed relationship with the bolt, the said stop thus serving through the agency of the timing element to retard the counter-recoil movement of the extension and thereby restore the proper timed relationship, and two companion abutments on the bolt and barrel extension respectively, the abutment on the bolt being normally in advance of that on the extension but being rearward thereof during the separate recoil and counter-recoil movements of the bolt and the two abutments being so related that when transverse movement of the timing element is permitted by the stop the said element moves to a position behind the bolt abutment and in front of the extension abutment so as to engage the two abutments and thereby prevent the barrel extension from moving forward out of proper timed relationship with the bolt.

17. A firearm as set forth in claim 16, wherein the timing element is connected with the receiver for movement about a fixed transverse axis.

18. In a firearm of the class described, the combination of a barrel and barrel extension movable rearward upon recoil, a rearward movable breech bolt, releasable means normally locking the breech bolt to the barrel extension, a spring actuated firing pin mounted in the breech bolt, firing mechanism including a trigger for releasing the firing pin, means operable upon recoil for unlocking the breech bolt from the barrel extension to permit it to move rearward independently thereof, a lever pivoted for movement about a transverse axis and having two arms extending in different directions and respectively serving when the lever is in its safety position to prevent rearward movement of the breech bolt and to prevent operation of the firing mechanism, a removable cover for partly enclosing the breech bolt, and a manually operable safety lever movably mounted upon the cover and detachably engageable with the first said safety lever when the cover is in place.

19. In a firearm of the class described, the combination of a barrel and barrel extension movable rearward upon recoil, a rearward movable breech bolt, releasable means normally locking the breech bolt to the barrel extension, means operable upon recoil for unlocking the breech bolt from the barrel extension to permit it to move rearward independently thereof, a manually movable lever having firing and safety positions and serving when in its safety position to prevent rearward movement of the breech bolt, and means movable with the barrel extension for engaging the lever to prevent movement thereof to its safety position when the barrel extension and breech bolt are in their rearmost positions.

20. A firearm as set forth in claim 19, wherein the means movable with the barrel extension and engaging the lever is a timing element also serving to maintain proper timed relationship between the breech bolt and the barrel extension.

In testimony whereof I have hereunto set my hand this 3rd day of September, 1929.

JONATHAN EDMUND BROWNING.